United States Patent [19]
Anderson

[11] 4,028,904
[45] June 14, 1977

[54] PREHEATER FOR WEAK ABSORBENT

[75] Inventor: Philip P. Anderson, Newburgh, Ind.

[73] Assignee: Arkla Industries Inc., Evansville, Ind.

[22] Filed: Dec. 24, 1975

[21] Appl. No.: 644,200

[52] U.S. Cl. .................................. 62/2; 62/483; 62/485; 62/489

[51] Int. Cl.² ........................................ F25B 15/06

[58] Field of Search ............... 62/2, 476, 483, 485, 62/487, 489

[56] References Cited
UNITED STATES PATENTS

| | | | |
|---|---|---|---|
| 2,221,971 | 11/1940 | Haywood | 62/2 |
| 3,266,266 | 8/1966 | Reid | 62/489 X |

Primary Examiner—Robert G. Nilson
Attorney, Agent, or Firm—Cushman, Darby & Cushman

[57] ABSTRACT

In an absorption refrigeration unit wherein a stream of relatively low temperature heating fluid such as solar heated water is used as the heat source for the vapor generator, the weak absorbent solution is preheated to almost its boiling temperature just before entering the generator by passing at relatively high velocity in heat exchange relationship with the stream of heating water leaving the generator. This arrangement makes it possible to have a relatively low heat transfer area in the generator while operating with heating water at a lower temperature than would otherwise be necessary.

4 Claims, 1 Drawing Figure

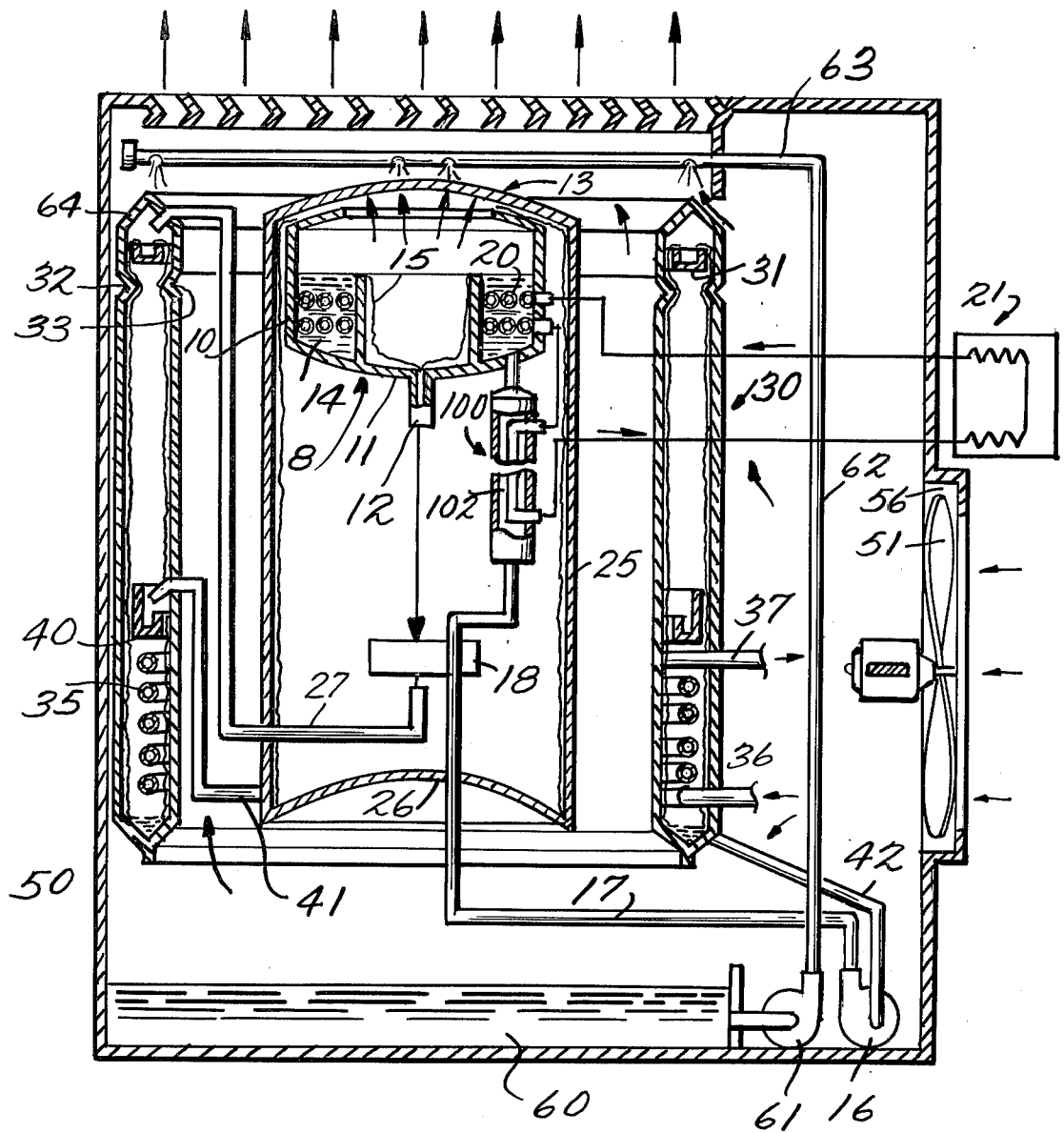

PREHEATER FOR WEAK ABSORBENT

The Government has rights in this invention pursuant to Grant No. GI-44095 awarded by the National Science Foundation.

This invention relates to absorption refrigeration systems and in particular to the construction and operation of the heating section of such systems when only a relatively low-temperature heat source is available.

BACKGROUND AND SUMMARY OF THE INVENTION

In absorption refrigeration units it is common pratice to cool the hot strong absorbent solution leaving the vapor generator by providing heat exchange between this solution and the relatively cold weak absorbent solution (rich in refrigerant) which is about to enter the generator. The heat transfer coefficient of a slow-moving non-boiling liquid is low compared to that of a boiling liquid, and therefore in this kind of arrangement the temperature of the weak absorbent solution leaving the heat exchanger is well below the boiling temperature. The heat input to the generator and hence the heat transfer area therein must therefore be sufficient to overcome this low coefficient in raising the solution to its boiling point. When a high temperature source such as a gas flame is available the resulting high temperature differential in the generator readily produces the required heat transfer.

If a relatively low-temperature heat source, such as a heat exchange liquid heated in a solar energy collector, is used in an absorption refrigeration system it can result in an appreciable increase in the heat transfer area required in the generator. This results in the disadvantages of increased complexity of construction and increased generator size and cost.

According to the principles of the present invention the solution which is rich in refrigerant just prior to entering the vapor generator, is passed in heat exchange relationship with the stream of heating medium leaving the generator, in a manner to preheat the temperature of the rich solution to a temperature very close to its boiling point. This can be accomplished by providing a solution pump to increase the normally low velocity of the rich solution and thereby increasing the coefficient of heat transfer in the preheater. Preferably the flow of solution along the heat exchange surface in the preheater is turbulent flow.

DESCRIPTION OF EXEMPLARY EMBODIMENT

The invention will be further understood from the following description of an exemplary embodiment taken with the drawing which is a schematic vertical sectional view of an absorption refrigeration system embodying the principles of the present invention.

Any of the conventionally known refrigerant compositions used in absorption refrigerating cycles may be used in the present system. A suitable composition is an aqueous solution of lithium chloride or lithium bromide or both wherein water is the refrigerant and a concentrated solution of the salt is the absorbent.

A vapor generator 8 for receiving solution which is rich in refrigerant includes a circular bowl-shaped vessel having a side wall 10 and a bottom 11 which is provided with a centrally disposed outlet 12. The generator 8 is enclosed within the upper end of a condenser 13 which is a vertically disposed cylindrical vessel. The rich solution to be boiled in the generator 8 is pumped into an annular partitioned section 14 defined by a circular wall 15 which is disposed within the circular bowl and which has a height somewhat less than that of the side wall 10. The solution is received under the necessary pressure from a pump 16 by way of a conduit 17 and a heat exchanger 18 that is also enclosed within the condenser 13. A spirally disposed heater 20 is submerged in the solution pumped into the annular space 14, and the refrigerant is boiled off from the solution under the pressure prevailing in the condenser 13. The heater 20 is a tubular coil which receives a recirculated stream of a heated heat-exchange fluid. In the illustrated embodiment the heat exchange fluid is water which is heated by radiant solar energy in a solar heating device 21. The device may be of any conventional construction which collects and absorbs radiant energy and transfers the resulting heat to the water. Refrigerant vapor expelled from the solution in the space 14 passes out of the open upper end of the generator 8 into immediate contact with the cool inner surface of the condenser 13.

The condenser 13 in the illustrated embodiment is a vertically disposed cylindrical vessel having an upwardly convex top, a cylindrical side wall 25 and a bottom wall 26. Refrigerant vapor from the generator 8 condenses on the cool side wall 25 and flows downwardly to be collected in the bottom of the condenser 13.

The hot solution that has been stripped of refrigerant vapor of the heater 20 overflows the top edge of the wall 15 in the generator 8 to flow to the bottom thereof and into the outlet 12 to escape from the generator 8 and flow through an outlet conduit 27 to the heat exchanger 18. Most of the heat in the overflowing solution is transferred to the inflowing solution being pumped to the generator 8 through the infeed conduit 17 so that the stripped solution is cooled and the solution rich in refrigerant is preheated as it flows to the generator 8.

An annularly shaped absorber-evaporator vessel 30 surrounds the condenser 13 which conveniently is disposed along the vertical axis of the vessel 30. The top of the absorber-evaporator 30 is situated at about the same level as the top of the condenser 13. Partially cooled stripped solution flowing from the heat exchanger 18 is delivered by the conduit 27 into a solution-receiving annular channel 31 supported within the upper end of the absorber-evaporator vessel 30. The channel 31 has a width that is almost as wide as the inside dimension of the absorber-evaporator 30. Just below the channel 31, the side walls of the vessel 30 have inward projections 32 and 33, formed therein, that extend under the channel 31, so that the solution overflowing from channel 31, flows on to these projections and follows their surfaces to flow downwardly over the inside surfaces of the side walls of the vessel 30.

Within the evaporator portion at the lower end of the absorber-evaporator vessel 30 is disposed a coil 35 for circulating a fluid such as water to be cooled. Suitable connections including inlet 36 and outlet 37 and circulating means not shown are provided to deliver the fluid to be cooled, through coil 35.

A second annular channel 40 is supported inside the annular vessel 30 just above the coil 35. The channel 40 receives liquid refrigerant delivered from the bottom of the condenser chamber 13 through a conduit 41. The liquid refrigerant overflows from the channel 40 onto the outer surface of the coil 35 where it vaporizes and removes heat from the fluid passing through the coil 35.

Refrigerant vapor formed in the evaporator portion of the vessel 30 flows upwardly in contact with the downwardly flowing solution on the inside walls of vessel 30. The refrigerant vapor dissolves in the liquid and the resulting solution collects in the bottom of the vessel 30. A conduit 42 connects the bottom of the vessel 30 with the intake to the pump 16 for recycling the enriched solution under pressure to the generator 13.

The entire assembly of generator 10, condenser 13 and the annular absorber-evaporator vessel 30, is enclosed on all sides and the bottom by a casing 50. A fan 51 is located within an air inlet aperture 52 in the side wall of the casing 50, and the top wall of the casing 50 includes an air outlet aperture provided with droplet eliminators 53. A reservoir 60 for holding an evaporative cooling liquid such as water is contained within the casing 50, and a pump 61 is provided for passing the water through a conduit 62 to a spray header 63 located in the upper end of the casing 50. The header 63 has at least one outlet positioned to shower cooling liquid onto the top edge of the condenser 13 so as to flow down over the outside of the side wall 25 to condense refrigerant vapor inside the condenser 13. The heater 63 includes a ring-shaped branch having outlets for spraying cooling liquid onto both sides of the peaked top 64 of the absorber-evaporator vessel 30. The fluid spray thus divided over the peak, flows down all exterior surfaces of the vessel 30 to remove heat from the solution flowing down the inside wall of the absorber portion of the vessel 30. The flow of ambient air over the film of cooling liquid on the vessel 30 and on the condenser 13 causes evaporation of the film, thereby cooling it.

According to the principles of the invention the solution which is rich in refrigerant is preheated, just prior to entering the generator 8, to a temperature almost equal to its boiling point by heat exchanger in a preheater 100. The preheater 100, which is illustrated schematically, passes the rich solution about to enter the generator 8 in counter-current heat exchange relationship with the solar heated water leaving the generator 8. The preheater 100 may be of any conventionl heat exchanger construction which is capable of effecting a high heat transfer rate. In a small refrigeration system the preheater 100 may be constructed of an inner tube for the heated water and an outer tube for the rich solution, the tubes being concentric and spiral. The annular space 102 between the tubes is sufficiently small in cross-section that the velocity of the solution, under the action of the pump 16, causes turbulent flow of the solution thereby increasing the coefficient of heat transfer. As a result of the preheating the rich solution can be brought to its boiling point and boiled in the generator 8 with a minimum of heat transfer surface therein, so that efficient use of that transfer surface can be made. In a test unit constructed initially without the preheater 100 and using cooling water at about 85° F it was found that the rich solution (lithium bromide in water) entered the generator 8 at a temperature about 18° F below its boiling point. As a result the unit would operate satisfactorily only if the solar heated water was at a temperature of 91.1° C (205° F). When the preheater 100 was added the rich solution entered the generator 8 at a temperature only about 5° below its boiling point so that the heat necessary to bring the solution to its boiling point was transferred rapidly with the existing heat transfer area, and it was possible to operate the unit using solar heated water of 90.6° C (195° F).

The remainder of the operation of the system may be conventional. The pressure in the generator and condenser space serves to drive the stripped solution through conduit 27 from the heat exchanger 18 into the channel 31 in the annular absorber-evaporator 30. Similarly, the liquid refrigerant in the reservoir at the bottom of the condenser 13 is driven up through conduit 41 to flow into channel 40 over the coil 35 by the pressure differential that exists between the generator-condensor space and the space in the vessel 30.

During normal operation the pump 16 delivers the refrigerant rich solution through the heat exchanger 18 and the preheater 100 into the generator space 14 at a rate such that the desired volume of the refrigerant is boiled out of the solution to be condensed in condenser 13 and collected at the bottom 26 thereof. The liquid refrigerant is then fed to the evaporator portion of the vessel 30 to be vaporized as it flows over the coil 35, the refrigerant vaporizing at a rate to provide the desired rate of B.T.U removal from the medium flowing in coil 35. The absorber portion of the vessel 30 is operative to cause the refrigerant vapor and solution to come into contact with each other to form an enriched solution and maintain the desired lower pressure within the evaporator portion of the vessel 30 by removing the refrigerant vapor. The solution is removed by pump 16 to continue the cycle. By properly designing the size and volume relationships together with the selection of the combination of refrigerant and solution to be used, an efficient compact concentrically arranged condenser and absorber-evaporator arrangement, is provided. When the apparatus is cooled with the ambient air circulation together with recirculation and partial evaporation of a cooling fluid such as water flowing over the surface of the various chambers of the apparatus, a much more compact, efficient and useful construction results, because it is unnecessary to provide a cooling tower for the cooling water.

While the description above covers the preferred form of the apparatus, it is apparent that modifications may be made without departing from the scope of the invention as defined in the following claims.

What is claimed is:

1. In an absorption refrigeration system having a refrigerant condenser, an evaporator, an absorber for absorbing refrigerant vapor from the evaporator into a liquid absorbent to thereby form a relatively cold solution rich in refrigerant, a generator for boiling off refrigerant vapor from the solution obtained from the absorber to thereby form a solution weak in refrigerant, said generator including means for passing a relatively hot stream of heat exchange fluid from a source thereof in heat exchange relationship with the solution in the generator,means for conducting the refrigerant vapor from the generator to the refrigerant condenser, and means for returning the solution weak in refrigerant to the absorber, the improvement which comprises a preheater for passing the solution about to enter the generator in heat exchange relationship with the stream of heat exchange fluid after the latter has left the generator.

2. An absorption refrigeration system as in claim 1 wherein said source of relatively hot heat exchange fluid includes a collector of radiant solar energy and means for heating a stream of liquid with the collected energy.

3. An absorption refrigeration system as in claim 1 including a pump for passing the solution through the preheater and wherein the preheater includes at least one solution passage which is sized and arranged to effect turbulent flow of the solution thereby increasing the coefficient of heat transfer in said passage.

4. An absorption refrigeration system comprising: a heater for collecting radiant solar energy and heating a mass of heat exchange liquid therewith; refrigerant vapor generator means; first conduit means for conducting a stream of heated liquid from the heater to the generator means and back to the heater to thereby boil absorbent solution in the generator means and produce refrigerant vapor and solution weak in refrigerant, means for conducting refrigerant vapor from the generator means to a refrigerant vapor condenser; means for conducting liquid refrigerant from the condenser to an evaporator; second conduit means for passing solution weak in refrigerant from the generator means to the absorber; third conduit means for passing solution rich in refrigerant from the absorber to the generator means, said third conduit means including a pump, a heat exchanger for warming the rich solution by passing it in heat exchange with the weak solution passing through said second conduit means and a preheater for further heating the weak solution by passing it in heat exchange relationship with the heat exchange liquid leaving in generator.

* * * * *